US012600225B2

(12) United States Patent

Sumie et al.

(10) Patent No.: US 12,600,225 B2

(45) Date of Patent: Apr. 14, 2026

(54) VEHICLE FRONT STRUCTURE

(71) Applicant: TOYOTA JIDOSHA KABUSHIKI KAISHA, Toyota (JP)

(72) Inventors: Yukari Sumie, Toyota (JP); Masayuki Okano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 308 days.

(21) Appl. No.: 18/455,249

(22) Filed: Aug. 24, 2023

(65) Prior Publication Data

US 2024/0166042 A1 May 23, 2024

(30) Foreign Application Priority Data

Nov. 17, 2022 (JP) ................................. 2022-184092

(51) Int. Cl.
| | |
|---|---|
| *B60K 11/08* | (2006.01) |
| *B60Q 5/00* | (2006.01) |
| *B60R 19/52* | (2006.01) |

(52) U.S. Cl.
CPC ................ *B60K 11/08* (2013.01); *B60Q 5/00* (2013.01); *B60R 19/52* (2013.01)

(58) Field of Classification Search
CPC ............ B60K 11/08; B60Q 5/00; B60R 19/52
USPC ....................................................... 180/68.1
See application file for complete search history.

(56) References Cited

U.S. PATENT DOCUMENTS

| | | | | |
|---|---|---|---|---|
| 10,110,981 | B2 * | 10/2018 | Kenaley ................... | H04R 1/28 |
| 10,538,158 | B2 * | 1/2020 | Sedlak ...................... | B60Q 5/00 |
| 10,576,885 | B2 * | 3/2020 | Schmitt ................... | B60R 21/34 |
| 2007/0205043 | A1 * | 9/2007 | Krueger ............ | G10K 11/1787 |
| | | | | 181/206 |
| 2014/0015654 | A1 * | 1/2014 | Nakayama ............. | G10K 11/28 |
| | | | | 340/425.5 |
| 2016/0368364 | A1 * | 12/2016 | Aoki ...................... | B60K 11/08 |
| 2017/0151907 | A1 * | 6/2017 | Sakamoto .............. | G10K 15/02 |
| 2019/0176694 | A1 | 6/2019 | Schmitt et al. | |
| 2020/0398643 | A1 * | 12/2020 | Miyazaki ............ | H01M 50/204 |
| 2021/0237673 | A1 | 8/2021 | Tokuyama et al. | |

FOREIGN PATENT DOCUMENTS

| | | | |
|---|---|---|---|
| JP | 2003-335173 | A | 11/2003 |
| JP | 2007-137368 | A | 6/2007 |
| JP | 2011-189906 | A | 9/2011 |
| JP | 2013-173445 | A | 9/2013 |
| JP | 2017-008748 | A | 1/2017 |
| JP | 2021-120241 | A | 8/2021 |
| JP | 2022-023369 | A | 2/2022 |

* cited by examiner

*Primary Examiner* — Hau V Phan

(74) *Attorney, Agent, or Firm* — SoraIP, Inc.

(57) ABSTRACT

The vehicle front structure includes a radiator provided at a distance from the front bumper to the rear, an air guide duct provided between the front bumper and the radiator in the vehicle front-rear direction, and a vibration member mounted on a wall surface of the air guide duct. Vibration of the vibration member vibrates the wall surface, whereby a sound (horn sound) is emitted to the internal space of the air guide duct. The horn sound is amplified by resonance in the internal space, and is emitted in the forward direction of the vehicle through the front opening of the air guide duct.

10 Claims, 5 Drawing Sheets

20

V

V

24

26

32

Z

X

VEHICLE FRONT STRUCTURE

CROSS-REFERENCE TO RELATED APPLICATION

This application claims priority to Japanese Patent Application No. 2022-184092 filed on Nov. 17, 2022, incorporated herein by reference in its entirety.

BACKGROUND

1. Technical Field

This specification discloses an improvement in vehicle front structure.

2. Description of Related Art

Japanese Unexamined Patent Application Publication No. 2022-23369 (JP 2022-23369 A) discloses a vehicle front structure in which an inner grille for increasing the rigidity of a front bumper cover is disposed in front of a horn device in the front-rear direction of a vehicle and a megaphone hole for propagating the sound from the horn device in the forward direction of the vehicle is provided in the inner grille. Japanese Unexamined Patent Application Publication No. 2017-8748 (JP 2017-8748 A) discloses a vehicle front structure including an intercooler, an air guide duct having an opening facing forward and configured to send air entering through the opening to the intercooler, and a horn device disposed inside the air guide duct.

SUMMARY

Vehicles can emit a horn sound. The horn sound is a sound emitted toward a person outside the vehicle by an operation of the driver. Conventionally, the horn sound is typically output from a horn device installed in the vehicle, as disclosed in JP 2022-23369 A or JP 2017-8748 A.

It is sometimes desired to increase the volume of the horn sound. For example, laws and regulations regarding the volume of the horn sound vary depending on the country. There is a demand to increase the volume of the horn sound so as to comply with the laws and regulations even in countries where a loud horn sound is required by their laws and regulations. There are cases where the horn sound is emitted in the forward direction of the vehicle through an opening that is open forward. However, a recent design trend is to reduce the area of an opening in the front part of the vehicle. It is therefore desired to emit a sufficiently loud horn sound in the forward direction of the vehicle even through a small opening.

One possible way to increase the volume of the horn sound that is output from a horn device is to increase the size of the horn device. However, such a large horn device may not be able to be installed due to space constraints in a vehicle front structure.

It is an object of a vehicle front structure disclosed in the present specification to increase the volume of the horn sound of a vehicle without increasing the size of a horn device.

A vehicle front structure disclosed in the present specification is characterized by including: a member to be cooled; an air guide duct having a front opening that is open in a forward direction of a vehicle, the air guide duct being configured to send air entering through the front opening to the member to be cooled; and a vibration member mounted on a wall surface of the air guide duct and configured to generate a horn sound in an internal space of the air guide duct by vibrating the wall surface.

According to this configuration, a horn sound is generated in the internal space of the air guide duct as the vibration member vibrates the wall surface of the air guide duct. The horn sound is amplified by resonance in the internal space of the air guide duct. The amplified horn sound is emitted in the forward direction of the vehicle through the front opening of the air guide duct.

The wall surface of the air guide duct may include a flat plate portion in a form of a flat plate. The vibration member may be mounted on a central part of the flat plate portion.

According to this configuration, the wall surface can be more suitably vibrated by the vibration member. That is, the volume of the horn sound can further be increased.

The vibration member may vibrate at a same frequency as a natural frequency of the internal space of the air guide duct.

According to this configuration, the horn sound emitted to the internal space of the air guide duct can be more suitably resonated. That is, the volume of the horn sound can further be increased.

An inner surface of the wall surface of the air guide duct may be a smooth surface.

According to this configuration, the horn sound is less likely to stagnate in the internal space of the air guide duct. That is, a decrease in volume of the horn sound that is emitted in the forward direction of the vehicle can be reduced.

The air guide duct may include a plurality of internal walls standing parallel to each other from an inner surface of the wall surface of the air guide duct toward the internal space of the air guide duct.

According to this configuration, standing waves can be generated between the internal walls. The volume of the horn sound can thus be further increased.

According to the vehicle front structure disclosed in the present specification, the volume of the horn sound of the vehicle can be increased without increasing the size of the horn device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
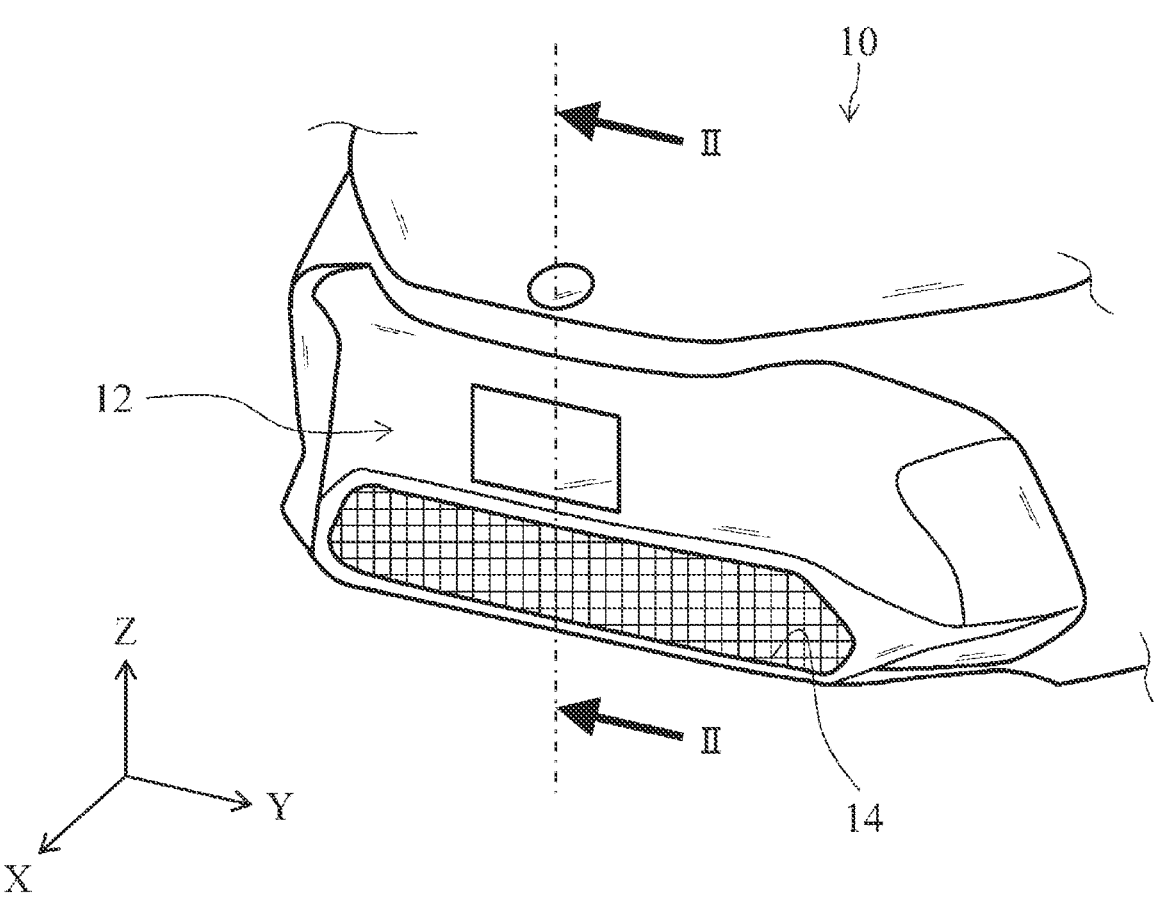
FIG. 1 is an external perspective view of a front structure of a vehicle according to the present embodiment.

FIG. 1 is an external perspective view of a vehicle front structure 10 according to the present embodiment. In each drawing of the present specification, the X-axis direction represents the vehicle front-rear direction, the Y-axis direction represents the vehicle width direction, and the Z-axis direction represents the height direction. In this specification, the forward direction in the front-rear direction of the vehicle is simply referred to as forward, and the rearward direction in the front-rear direction of the vehicle is simply referred to as rearward.

The vehicle front structure 10 includes a front bumper 12. The front bumper 12 is provided with a front grille 14. The front grille 14 is an opening for taking in air from the front of the vehicle into the vehicle.

Figure 2:
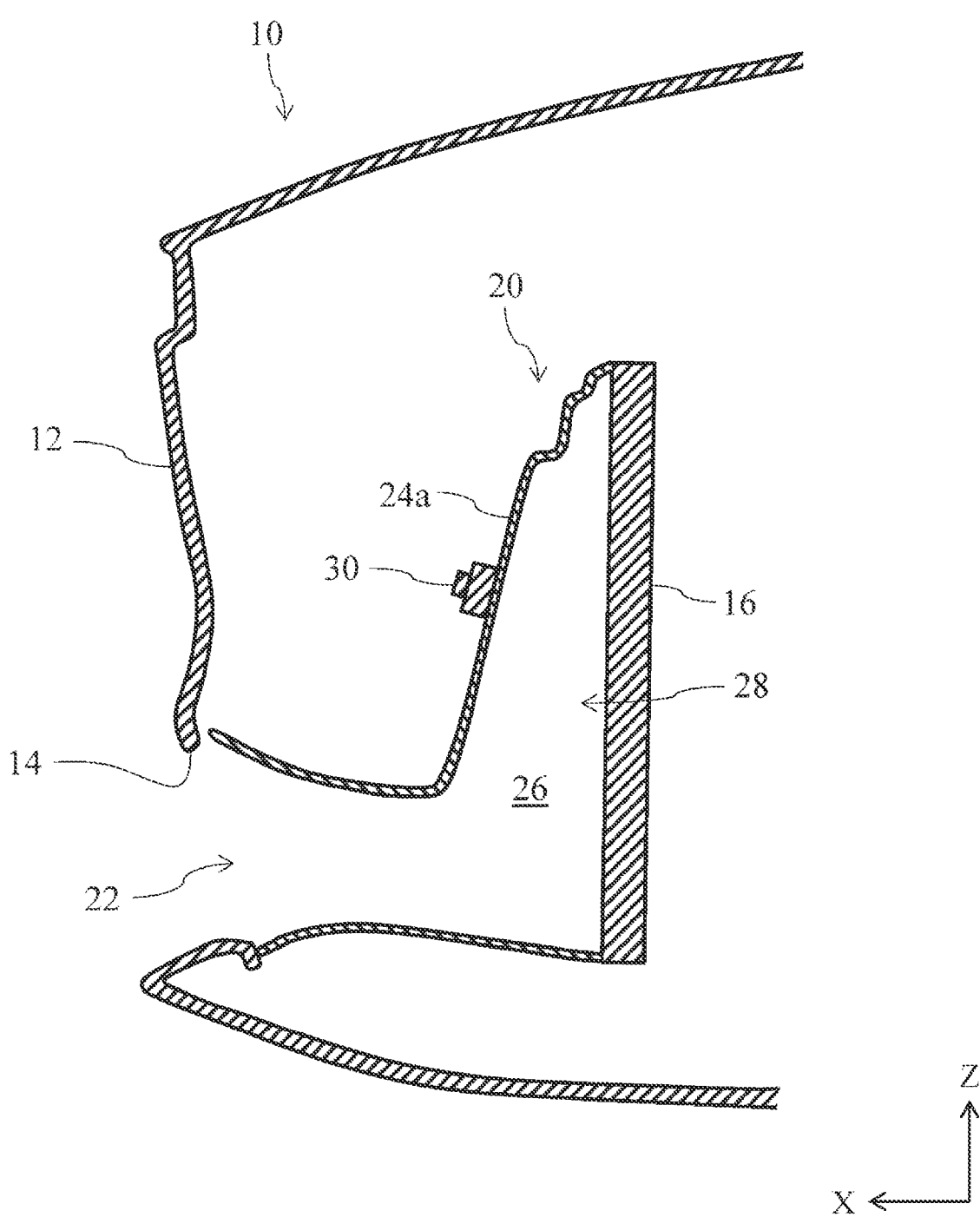
FIG. 2 is a cross-sectional view of II-II of FIG. 1.

FIG. 2 is a cross-sectional view taken along II-II of FIG. 1; The vehicle front structure 10 includes a radiator 16 as a member to be cooled, which is provided at a distance rearward from the front bumper 12. The radiator 16 cools a medium (e.g., water) for cooling a motor or the like. The member to be cooled is not limited to the radiator 16. For example, the member to be cooled may be an intercooler for lowering the temperature of the air compressed by the turbo.

Figure 3:
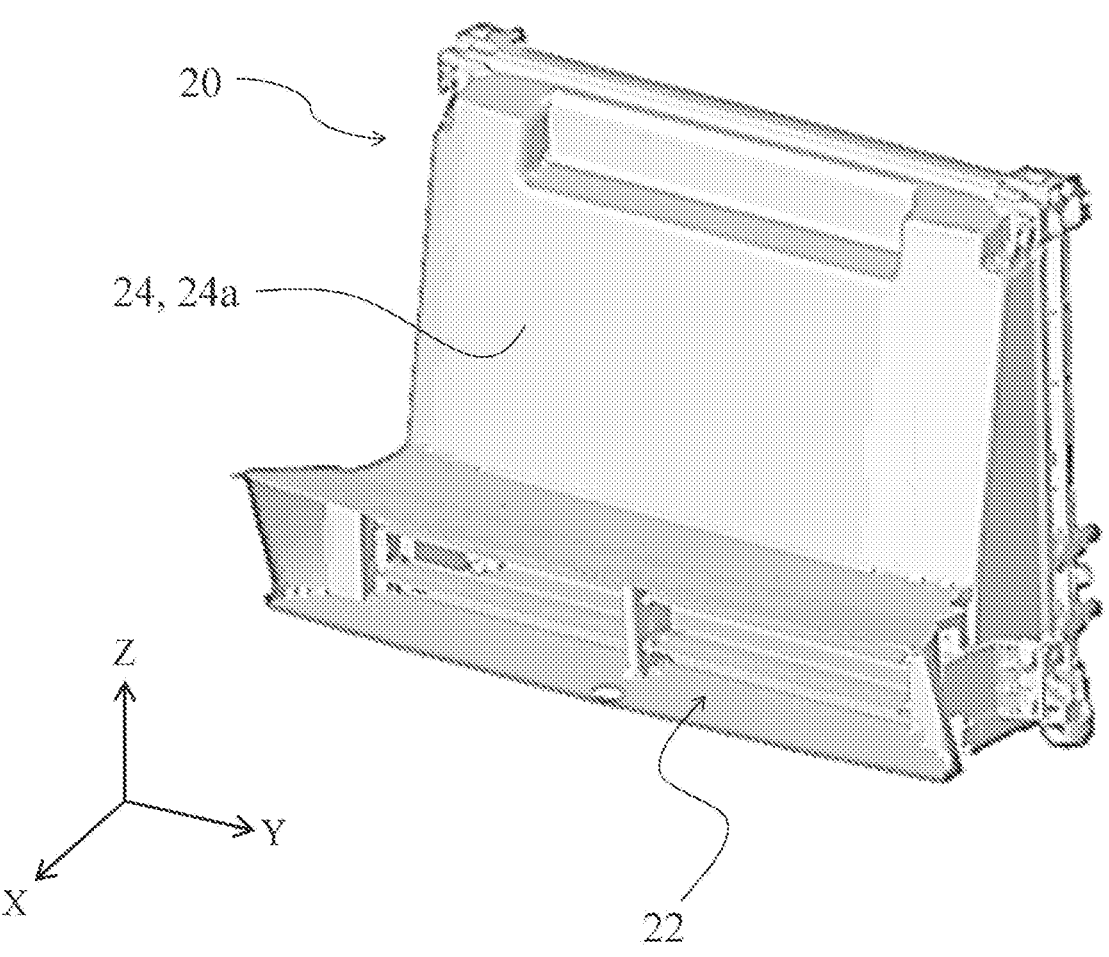
FIG. 3 is a perspective view of an air guide duct.

The vehicle front structure 10 includes an air guide duct 20 provided between the front bumper 12 and the radiator 16 in the vehicle front-rear direction. The air guide duct 20 is made of resin. FIG. 3 is a perspective view of the air guide duct 20. Hereinafter, the air guide duct 20 will be described with reference to FIGS. 2 and 3.

The air guide duct 20 has a front opening 22 that opens in the forward direction of the vehicle. The air guide duct 20 has a plurality of wall surfaces 24. The plurality of wall surfaces 24 form an internal space 26 of the air guide duct 20. Further, the air guide duct 20 has a rear opening 28. The rear opening 28 is connected to the radiator 16. With such a configuration, the air entering through the front opening 22 is sent to the radiator 16 through the internal space 26 and the rear opening 28 by the air guide duct 20. Thus, the radiator 16 is cooled. The air guide duct 20 has the same width (length in the vehicle width direction) as that of the front grille 14.

As shown in FIG. 1 or 2, the front grille 14 is provided near the lower end of the front bumper 12. Since the front opening 22 of the air guide duct 20 is provided so as to communicate with the front grille 14, the front opening 22 is also provided in the vicinity of the lower end of the vehicle. More preferably, the opening size of the rear opening 28 is larger than the opening size of the front opening 22 so that the air hits the radiator 16. As shown in FIG. 2 or FIG. 3, in the present embodiment, the upper wall surface 24 of the air guide duct 20 ascends upward toward the rear. As a result, the opening size of the rear opening 28 is enlarged. The wall surface 24 that constitutes the approaching part is referred to as a front wall surface 24a. The front wall surface 24a has a flat plate shape. That is, the front wall surface 24a corresponds to a flat plate portion. The front wall surface 24a is a tilted surface facing forward and upward. The front wall surface 24a is the wall surface 24 having the largest area among the plurality of wall surfaces 24 forming the internal space 26.

As shown in FIG. 2, the vehicle front structure 10 includes a vibration member 30. The vibration member 30 is, for example, a vibration motor. The vibration member 30 is mounted on the wall surface 24 of the air guide duct 20. In the present embodiment, one vibration member 30 is mounted on the air guide duct 20, but a plurality of vibration members 30 may be mounted on the air guide duct 20. The vibration member 30 is connected to a controller (for example, an in-vehicle electronic control unit (ECU) (not shown), and vibrates according to a control signal transmitted from ECU in response to an operation of an occupant of the vehicle.

As the vibration member 30 vibrates, the wall surface 24 of the air guide duct 20 vibrates. Sound is generated by vibration of the wall surface 24. This sound is a horn.

The horn sound generated by the vibration of the vibration member 30 is discharged into the internal space 26 of the air guide duct 20. By adjusting the vibration amount (amplitude) of the vibration member 30, the volume of the horn sound emitted to the internal space 26 can be adjusted. The internal space 26 has a natural frequency, and the sound emitted into the internal space 26 resonates at the natural frequency of the internal space 26. As a result, the horn sound is amplified. The amplified horn sound is emitted in the forward direction of the vehicle through the front opening 22 and the front grille 14. As described above, in the present embodiment, instead of increasing the size of the horn device, the wall surface 24 of the air guide duct 20 is vibrated by the vibration member 30 to generate a horn sound, and the horn sound is amplified by the resonance in the internal space 26 of the air guide duct 20.

In order to be able to vibrate the wall surface 24 more suitably by the vibration member 30, the vibration member 30 may be mounted on the wall surface 24 having as large an area as possible. In the present embodiment, the vibration member 30 is mounted on the front wall surface 24a. Furthermore, the vibration member 30 may be mounted on a central portion of the wall surface 24 (the front wall surface 24a in the present embodiment) so that the wall surface 24a can be vibrated more suitably.

The vibration member 30 may vibrate at the same frequency as the natural frequency of the internal space 26. As a result, in the horn sound emitted to the internal space 26, the frequency component in the vicinity of the natural frequency of the internal space 26 increases, and the horn sound emitted to the internal space 26 can be more suitably resonated. That is, the volume of the horn sound can be increased.

The inner surface (surface facing the internal space 26) of the wall surface 24 of the air guide duct 20 may be formed of a smooth surface. The "inner surface of the wall surface 24 is a smooth surface" means that the inner surface of the wall surface 24 is formed of a continuous plane or curved surface, and there is no corner portion, step portion, protruding portion, or the like on the inner surface of the wall surface 24. Since the inner surface of the wall surface 24 is a smooth surface, the horn sound is less likely to stagnate in the internal space 26. That is, a decrease in volume of the horn sound that is emitted in the forward direction of the vehicle can be reduced. As a secondary effect of the inner surface of the wall surface 24 being a smooth surface, air entering through the front opening 22 can be smoothly sent to the radiator 16 without stagnating in the internal space 26. Thus, the radiator 16 can be cooled more suitably.

The front opening 22 may be megaphone-shaped. The megaphone shape means a shape in which the opening cross-sectional area gradually increases toward the front. As a result, the opening size of the front opening 22 becomes larger, and the volume of the horn sound emitted from the front opening 22 can be increased. In addition, the megaphone shape allows a sound wave (horn sound) closer to the plane wave to be output from the front opening 22, so that the sound can be propagated without attenuating the horn sound further.

Figure 4:
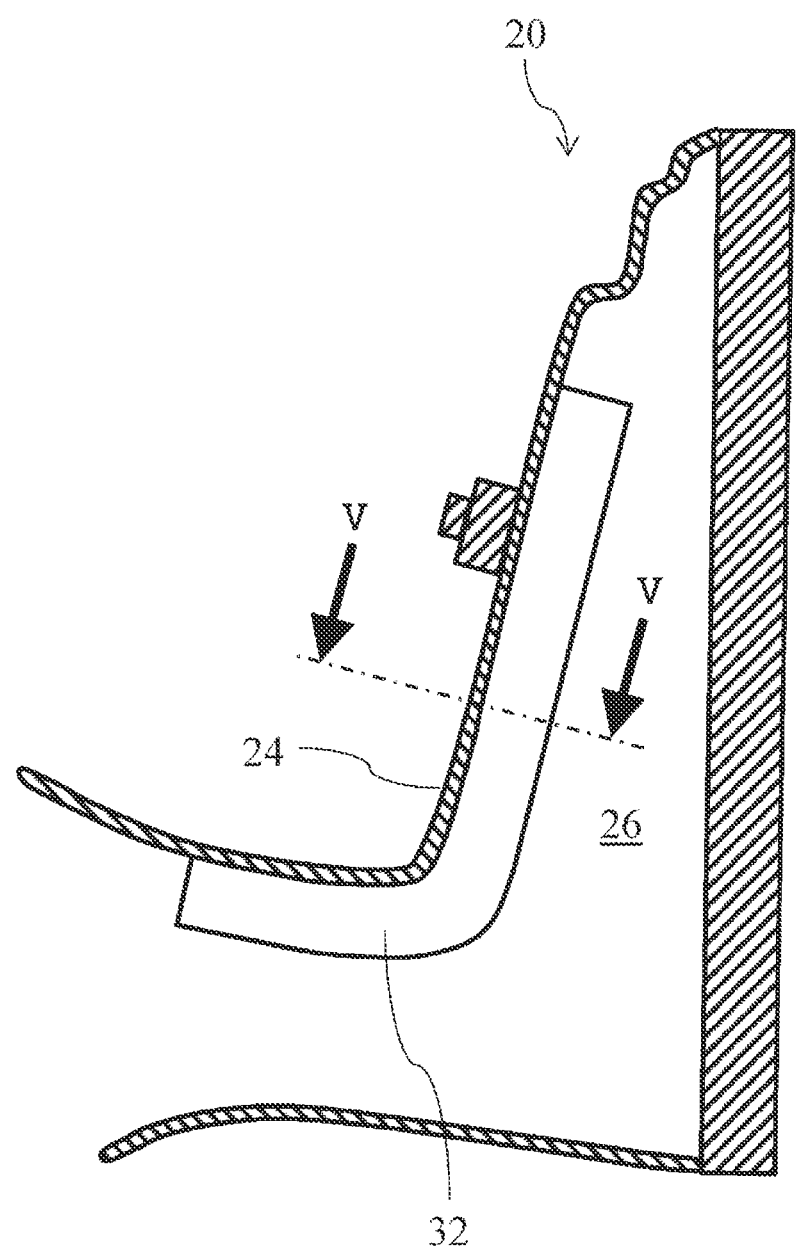
FIG. 4 shows an internal wall.
Figure 4:
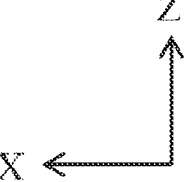
Figure 5:
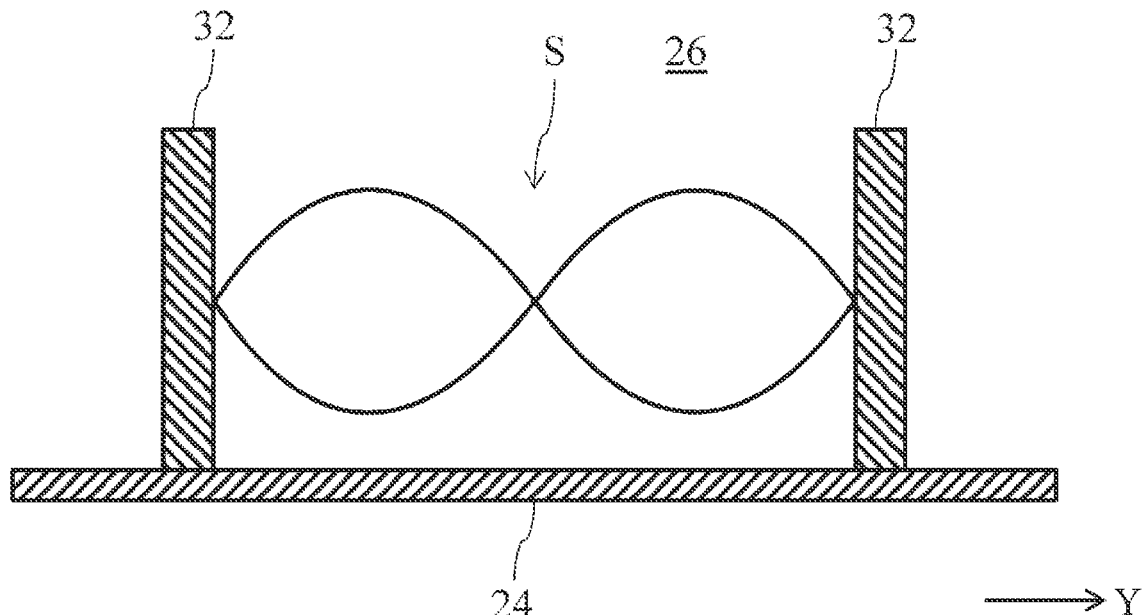
FIG. 5 is a conceptual diagram illustrating standing waves generated by the internal walls.

FIG. 4 is a cross-sectional view showing an internal wall 32 provided in the air guide duct 20. FIG. 5 is a cross-sectional view taken along V-V of FIG. 4. The air guide duct 20 may have a plurality of the internal walls 32 standing parallel to each other from the inner surface of the wall surface 24 toward the internal space 26. In FIG. 5, two internal walls 32 are provided. However, three or more internal walls 32 may be provided. The internal walls 32 may be provided to extend in the vehicle front-rear direction so as not to obstruct the flow of sound or air in the internal space 26. The internal walls 32 are made of resin.

As shown in FIG. 5, the internal walls 32 are provided so as to face each other. This makes it possible to generate standing waves S in the internal space 26 (in particular between the internal walls 32). By generating the standing waves S, the volume of the horn sound can be increased.

While electrified vehicle embodiments according to the present disclosure have been described above, electrified vehicle according to the present disclosure is not limited to the above-described embodiments, and various modifications can be made without departing from the gist thereof.

What is claimed is:

1. A vehicle front structure, comprising:

a member to be cooled;

an air guide duct having a front opening that is open in a forward direction of a vehicle, the air guide duct being configured to send air entering through the front opening to the member to be cooled; and a vibration member mounted on a surface of a wall of the air guide duct and configured to generate a horn sound in an internal space of the air guide duct by vibrating the surface of the wall, wherein the front opening has a cross-sectional area that increases toward the forward direction of the vehicle, and the wall of the air guide duct includes a plurality of internal walls, wherein the plurality of internal walls stand from an inner surface of the wall toward the internal space and are parallel to each other.

2. The vehicle front structure according to claim 1, wherein:

the wall of the air guide duct includes a flat plate portion in a form of a flat plate; and the vibration member is mounted on a central part of the flat plate portion.

3. The vehicle front structure according to claim 1, wherein the vibration member vibrates at a same frequency as a natural frequency of the internal space of the air guide duct.

4. The vehicle front structure according to claim 1, wherein the inner surface of the wall of the air guide duct is smooth.

5. The vehicle front structure according to claim 4, wherein the inner surface of the wall of the air guide duct includes a continuous plane or curved surface with no steps or protrusions.

6. The vehicle front structure according to claim 1, wherein each internal wall of the plurality of internal walls includes a first edge and a second edge opposite to the first edge, the first edge being connected to the inner surface of the wall of the air guide duct, and the second edge being a free edge.

7. The vehicle front structure according to claim 1, wherein the wall of the air guide duct includes two internal walls that face each other so as to generate a standing wave between the two internal walls.

8. The vehicle front structure according to claim 1, wherein the member to be cooled is a radiator.

9. The vehicle front structure according to claim 1, wherein the front opening of the air guide duct has a megaphone shape.

10. The vehicle front structure according to claim 1, wherein the vibration member is a motor configured to vibrate in response to receiving a control signal transmitted from an in-vehicle electronic control unit mounted on the vehicle.

* * * * *